(12) United States Patent
Tang

(10) Patent No.: US 9,000,627 B2
(45) Date of Patent: Apr. 7, 2015

(54) LINEAR MOTOR WITH BACK YOKE

(75) Inventor: Yuqi Tang, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 295 days.

(21) Appl. No.: 13/532,899

(22) Filed: Jun. 26, 2012

(65) Prior Publication Data

US 2012/0326533 A1   Dec. 27, 2012

(30) Foreign Application Priority Data

Jun. 27, 2011 (JP) ................................. 2011-142208

(51) Int. Cl.
*H02K 41/03* (2006.01)
*H02K 1/12* (2006.01)
*H02K 3/47* (2006.01)

(52) U.S. Cl.
CPC ............... *H02K 41/031* (2013.01); *H02K 1/12* (2013.01); *H02K 3/47* (2013.01); *H02K 2213/03* (2013.01)

(58) Field of Classification Search
CPC .................................................... H02K 41/03
USPC ........... 310/12.02, 12.21–12.26, 12.31, 12.33
See application file for complete search history.

(56) References Cited

U.S. PATENT DOCUMENTS

| | | | | |
|---|---|---|---|---|
| 4,358,691 A | * | 11/1982 | Naylor | 310/12.24 |
| 4,785,816 A | * | 11/1988 | Dow et al. | 600/446 |
| 5,434,549 A | * | 7/1995 | Hirabayashi et al. | 335/229 |
| 6,969,929 B2 | * | 11/2005 | Finkbeiner | 310/12.21 |
| 2006/0028072 A1 | * | 2/2006 | Iwasa et al. | 310/14 |
| 2006/0213467 A1 | * | 9/2006 | Froeschle et al. | 123/90.11 |
| 2008/0079522 A1 | | 4/2008 | Okada et al. | |
| 2009/0033157 A1 | * | 2/2009 | Maemura et al. | 310/12 |
| 2010/0308669 A1 | * | 12/2010 | Wang et al. | 310/12.25 |
| 2011/0062799 A1 | * | 3/2011 | Chao et al. | 310/12.02 |

FOREIGN PATENT DOCUMENTS

| | | | | |
|---|---|---|---|---|
| CN | 85200996 U | * | 1/1986 | |
| JP | 11976-007605 U | | 1/1976 | |
| JP | 11977-114544 U | | 8/1977 | |
| JP | 07-322595 | | 12/1995 | |
| JP | 09-172767 | | 6/1997 | |
| JP | 11225468 A | * | 8/1999 | ............ H02K 41/03 |
| JP | 2005-124334 | | 5/2005 | |
| JP | 2007043780 A | * | 2/2007 | |
| JP | 2007189837 A | * | 7/2007 | |
| JP | 2007-306704 | | 11/2007 | |

(Continued)

OTHER PUBLICATIONS

Chen, CN85200996U machine translation, Jan. 1986.*

(Continued)

*Primary Examiner* — Quyen Leung
*Assistant Examiner* — Eric Johnson
(74) *Attorney, Agent, or Firm* — Rankin, Hill & Clark LLP

(57) ABSTRACT

Provided herein is a linear motor in which a back yoke can readily be mounted onto a linear motor body. The linear motor body is surrounded or wrapped by the back yoke that works to form part of a magnetic circuit of the linear motor body. The back yoke assembly includes first and second divided assemblies. The first and second divided assemblies have the same dimension and shape, and are each formed by press working a silicon steel plate or a magnetic plate made of SPCC material.

8 Claims, 14 Drawing Sheets

(56) References Cited

FOREIGN PATENT DOCUMENTS

| | | | |
|---|---|---|---|
| JP | 2008-086144 | | 4/2008 |
| JP | 2008193760 | A * | 8/2008 |
| JP | 2009-100617 | | 5/2009 |
| JP | 4385406 | | 12/2009 |
| JP | 2010-288418 | | 12/2010 |
| WO | 2007/046161 | | 4/2007 |

OTHER PUBLICATIONS

Naraita, JP2007043780 machine translation, Feb. 2007.*
SHibata, JP2008-193760 machine translation, Aug. 2008.*
Japanese Office Action with English Translation dated Dec. 24, 2014, 9 pages.

\* cited by examiner

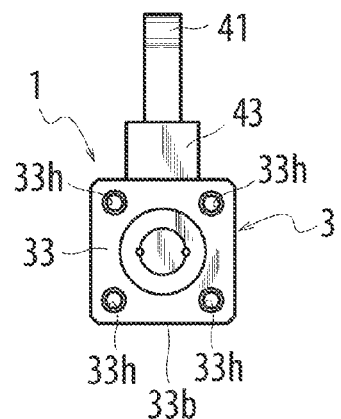
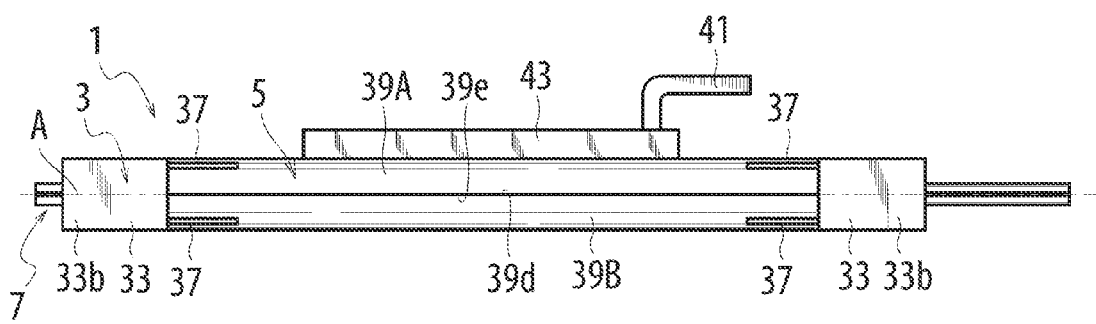

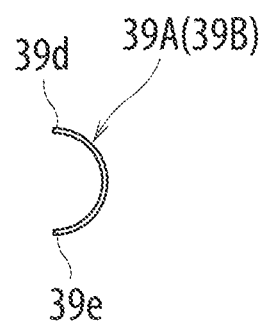
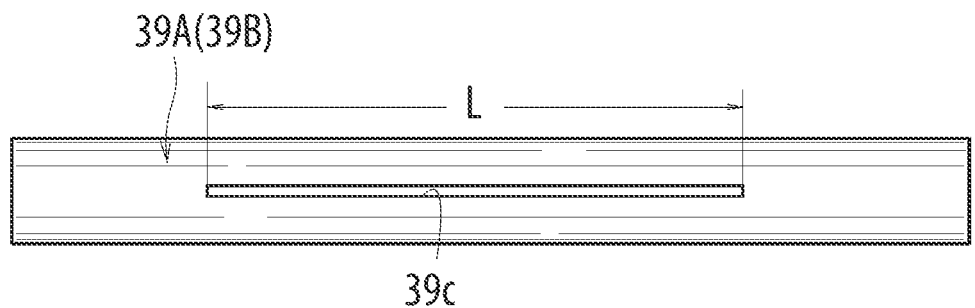

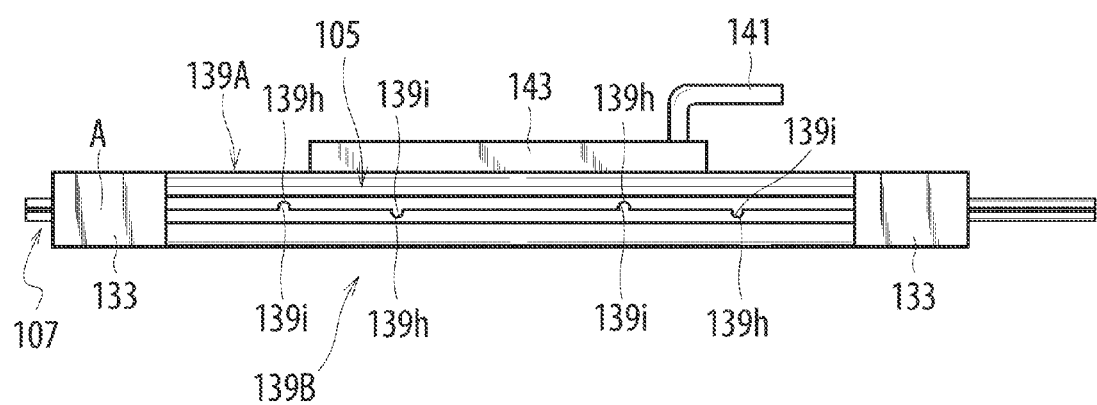

LINEAR MOTOR WITH BACK YOKE

TECHNICAL FIELD

The present invention relates to a linear motor in which a mover reciprocates with respect to a stator.

BACKGROUND OF THE INVENTION

Japanese Patent No. 4385406 (JP 4385406) discloses a linear motor body including a mover and a stator, the mover including a direct drive shaft capable of reciprocating in an axial direction thereof and a permanent magnet array mounted to the direct drive shaft, the stator having a plurality of excitation windings each formed of a winding conductor wound in a coil such that the mover reciprocates in an inner space defined inside the excitation windings. A back yoke is disposed outside the stator of the linear motor body to partly form a magnetic circuit of the linear motor body. The back yoke is constituted from a pipe made of magnetic material. In this example, there are a plurality of linear motor bodies that are supported, being sandwiched between a block frame and a cover.

The manufacturing process of such conventional linear motor is complicated since the back yoke formed of a pipe must be mounted onto linear motor bodies. In addition, the back yoke is large in size and heavy in weight. Consequently, the linear motor is inevitably large in volume and heavy in weight.

SUMMARY OF THE INVENTION

An object of the present invention is to provide a linear motor in which a back yoke can readily be mounted onto a linear motor body.

Another object of the present invention is to provide a linear motor of which the volume and weight can be reduced.

A linear motor of the present invention comprises a linear motor body and a back yoke. The linear motor body includes a mover including a direct drive shaft capable of reciprocating in an axial direction thereof and a permanent magnet array formed of a plurality of permanent magnets mounted to the direct drive shaft. The stator has a plurality of excitation windings disposed along an axial line of the direct drive shaft. The excitation windings are each formed of a winding conductor wound in a coil such that the mover reciprocates in an inner space defined inside the excitation windings. The back yoke is disposed outside the stator of the linear motor body to partly form a magnetic circuit of the linear motor body. The back yoke is constituted from a back yoke assembly made of magnetic material and entirely surrounding the linear motor body.

When the back yoke is constituted from a back yoke assembly including a surrounding portion entirely surrounding the linear motor body as with the present invention, it is easy to mount the back yoke onto the linear motor body simply by assembling the back yoke assembly with the linear motor body.

The back yoke assembly preferably includes a first divided assembly and a second divided assembly that are combined such that abutting surfaces of the first and second assemblies extend in the axial direction. Thus, the back yoke assembly may readily be assembled merely by combining the first and second divided assemblies.

The first and second assemblies preferably have the same dimension and shape. In this case, a divided assembly of one sort can be used as either of the first and second divided assemblies.

The first and second divided assemblies may each be formed by press working a magnetic plate. Even if the shapes of the first and second divided assemblies are complicated, the first and second divided assemblies may readily be formed. Since the divided assemblies are each formed by press working a magnetic plate, the linear motor may be downsized in volume and weight.

Generally, lead wires are connected to the excitation windings to supply electric power to the excitation windings. At least one of the first and second divided assemblies preferably has a through hole formed for the lead wires to pass therethrough. With this, the lead wires may readily be guided to the outside.

The through hole may be formed in a slit extending in the axial direction. In this case, a dimension between the center of the through hole in the axial direction and the center of the first or second assembly in the axial direction is preferably in a range of $\frac{1}{4}\tau p$ to $\frac{1}{2}\tau p$ where $\tau p$ denotes a pitch of the permanent magnets in the permanent magnet array; and a length of the through hole in the axial direction is preferably in a range of $(n-\frac{1}{2})\tau p$ to $(n+\frac{1}{2})\tau p$ where n stands for a natural number and $\tau p$ for a pitch of the permanent magnets in the permanent magnet array. With these definitions, the influence of cogging torque caused due to end portions of the slit may be reduced.

The stator may include an insulating pipe inside of which the mover is disposed and on which the excitation windings are mounted. In this configuration, a pair of end brackets are fixed at axial ends of the insulating pipe. The end brackets each have a bearing fixed therein to support the end of the direct drive shaft movably in the axial direction and unrotatably in a circumferential direction. The back yoke assembly is preferably disposed across the pair of end brackets. With this, a plurality of excitation windings may readily be disposed simply by winding a winding conductor around the insulating pipe to form the excitation windings. Further, the back yoke assembly may securely be fixed onto the linear motor body.

The direct drive shaft may include a cylindrical shaft body housing the permanent magnet array formed of the plurality of permanent magnets that are arranged such that magnetic poles having the same polarity are opposed to each other, and a pair of shaft end members connected to axial ends of the shaft body and supported by the bearings. Preferably, in this configuration, the shaft body and the pair of shaft end members are coupled by coupling pieces; the shaft body is fixedly fitted with an outer peripheral portion of each coupling piece; and the shaft end members are fixedly fitted into an inner peripheral portion of each coupling piece. With this, the shaft body and the pair of shaft end members may easily be connected to each other simply via the coupling pieces.

The outer peripheral portion of each coupling piece has a smooth surface portion located to the center of the shaft body in a longitudinal direction of the shaft body and a rough surface portion located away from the center of the shaft body in the longitudinal direction. End portions of the shaft body are preferably disposed to be in contact with both of the smooth and rough surface portions. In this manner, the shaft body and the coupling pieces may securely be fixed while maintaining the concentricity of the shaft body and the coupling pieces.

The outer peripheral portion of each coupling piece may have a plurality of concave portions formed therein; and the end portions of the shaft body may have a plurality of convex portions formed therein to be fitted with the concave portions. In this configuration, the coupling pieces and the shaft body may tightly be fixed by fitting the convex portions of the shaft body into the concave portions of the coupling pieces.

The pair of end brackets each include a bracket body portion into which the insulating pipe is inserted and fitted and with which end portions of the back yoke assembly are fitted, and an enlarged portion provided continuously with the bracket body portion and having a larger dimension than the bracket body portion as measured in a direction perpendicular to the axial direction. One or more pressing members may be fixedly provided along an outer surface of the first divided assembly and operable to press the first divided assembly onto each end bracket body. One or more pressing members may be fixedly provided along an outer surface of the second divided assembly and operable to press the second divided assembly onto each end bracket body. In this configuration, the first and second divided assemblies may securely be fixed onto the end bracket bodies by pressing the first and second divided assemblies onto the end bracket bodies with the pressing members. If the first and second divided assemblies are fixed onto the end bracket bodies using an adhesive, the first and second divided assemblies and the end bracket bodies may securely be fixed by means of adhesion.

Each enlarged portion may have a rectangular outline as viewed in the axial direction. In this case, pins forming the pressing member may be fixed to four corners of each enlarged portion. With this, the first and second divided assemblies may securely be fixed to the end bracket bodies uniformly without partial bias.

BRIEF DESCRIPTION OF THE DRAWINGS

These and other objects and many of the attendant advantages of the present invention will readily be appreciated as the same becomes better understood by reference to the following detailed description when considered in connection with the accompanying drawings.

FIG. 1 is a front view of a liner motor according to an embodiment of the present invention.

FIG. 2 is a right side view of the linear motor of FIG. 1.

FIG. 8B illustrates the end bracket as a cross sectional view of the upper half portion thereof.

FIGS. 9A and 9B are a front view and a right side view, respectively, of a first divided assembly (or a second divided assembly) used in the linear motor of FIG. 1.

FIG. 10 is a right side view of a linear motor according to another embodiment of the present invention.

DETAILED DESCRIPTION OF THE EMBODIMENTS

Figure 3:
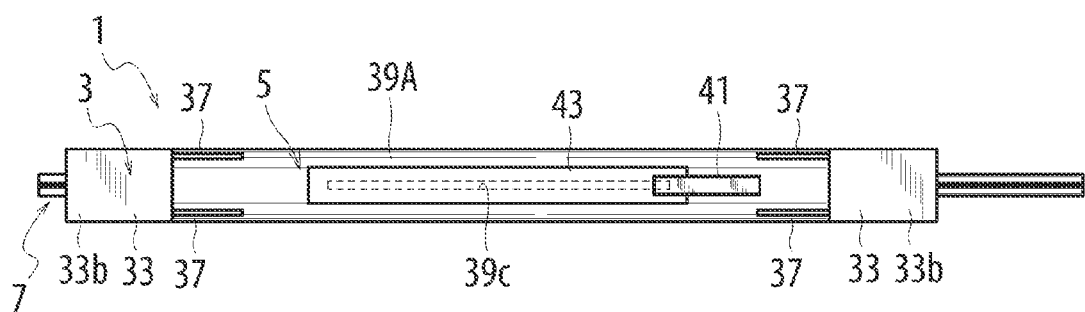
FIG. 3 is a plan view of the linear motor of FIG. 1.
Figure 4:
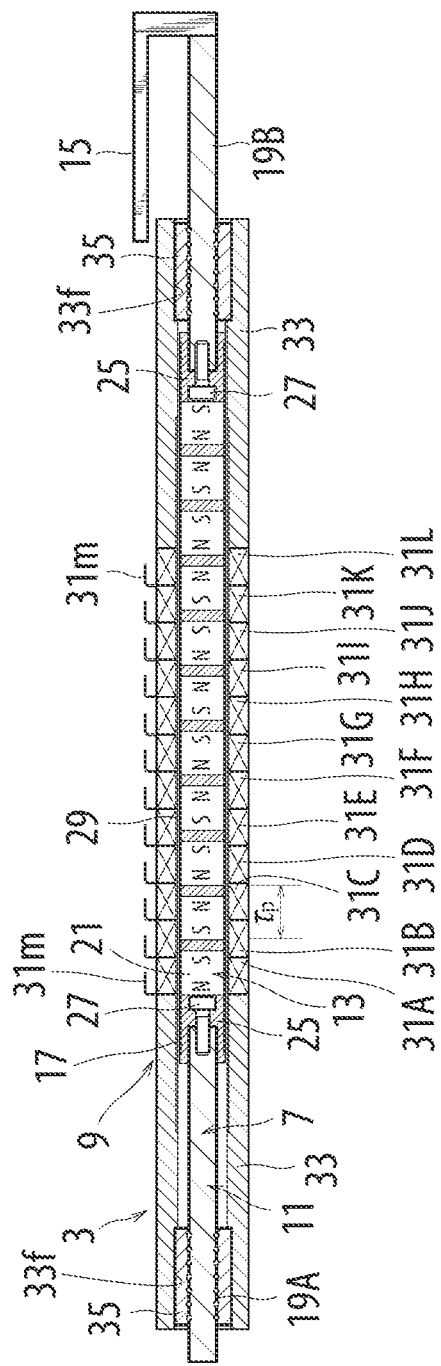
FIG. 4 is a cross sectional view of a linear motor body used in the linear motor of FIG. 1.
Figure 5:
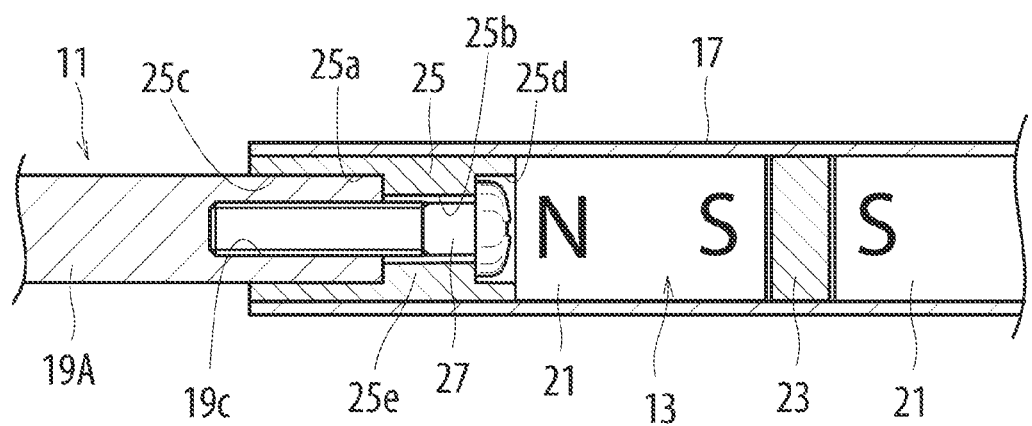
FIG. 5 is an enlarged partial view of the linear motor body of FIG. 4.
Figure 6:
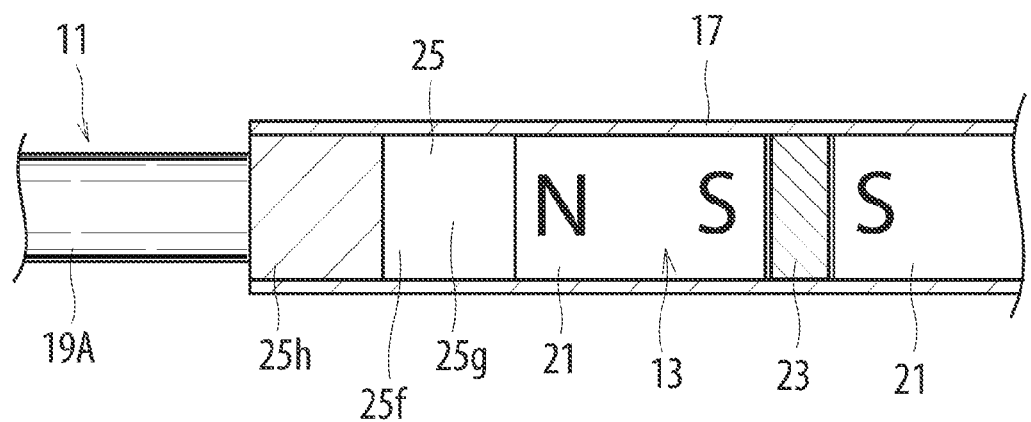
FIG. 6 illustrates a coupling piece and a shaft end member of FIG. 5 in a plane.

Now, embodiments of the present invention will be described below in detail with reference to the accompanying drawings. FIGS. 1 to 3 are a front view, a right side view, and a plan view of a linear motor according to an embodiment of the present invention. As shown in these figures, the linear motor of the present invention comprises one linear motor body 3 and a back yoke 5. The linear motor body 3 includes a mover 7 and a stator 9 as shown in FIG. 4. FIG. 4 is a cross sectional view of the linear motor body 3, and permanent magnets 21 are depicted in a plane for easy understanding. The mover 7 includes a direct drive shaft 11, a permanent magnet array 13, and a linear scale 15. The direct drive shaft 11 includes a shaft body 17 and a pair of shaft end members 19A, 19B, and is capable of reciprocating in an axial direction thereof. As shown in FIGS. 5 and 6, the shaft body 17 is constituted from a cylindrical pipe made of non-magnetic stainless metal material, and houses the permanent magnet array 13 therein. FIG. 5 is an enlarged partial view of FIG. 4. FIG. 6 illustrates a coupling piece 25 and a shaft end member 19A of FIG. 5 in a plane. The permanent magnet array 13 is formed of a plurality of columnar permanent magnets 21 that are disposed via spacers 23 made of magnetic material such as iron. The permanent magnets 21 are arranged in the axial direction such that magnetic poles of two adjacent permanent magnets having the same polarity are opposed to each other.

As shown in FIG. 4, the pair of shaft end members 19A, 19B are each shaped in an elongated bar. The shaft end members 19A, 19B are connected to axial ends of the shaft body 17 and supported by a pair of bearings 35 slidably in a thrust direction. The linear scale 15 is mounted on the shaft end member 19B shown in the right side of FIG. 4. The linear scale 15 is opposed to a linear sensor, not illustrated, disposed outside the linear motor. The linear scale 15 and the linear sensor, not illustrated, jointly form a position detecting device to detect a position of the mover 7. The linear scale is omitted in FIGS. 2 and 3. The pair of shaft end members 19A, 19B are coupled to the shaft body 17 via the coupling pieces 25 as shown in FIGS. 5 and 6. The coupling pieces 25 are made of metal material such as iron and stainless metal material. The coupling pieces 25 each have a hollow portion 25a inside thereof as shown in FIG. 5. The hollow portion 25a includes a small-diameter portion 25b and two large-diameter portions 25c, 25d having a larger diameter than the small-diameter portion 25b and located on either side of the small-diameter portion 25b. In other words, a projecting portion 25e extending radially inwardly is formed in the vicinity of the axial center of hollow portion 25a. As shown in FIG. 6, an outer peripheral portion 25f of each coupling piece 25 has a smooth surface portion 25g having a smooth surface and located to the center of the shaft body 17 in a longitudinal direction of the shaft body 17 and a rough surface portion 25h having a rough surface and located away from the center of the shaft body 17 in the longitudinal direction. The rough surface portion 25h is formed by scratching the surface with a working tool to cause pricks of approximately 0.1 to 0.3 mm in height on the surface. End portions of the shaft body 17 are disposed such that inner peripheral surfaces of the end portions of the shaft body 17 are in contact with both of the smooth and rough surface portions 25g, 25h. In this embodiment, an adhesive is applied to the outer peripheral portion 25f of each coupling piece 25 and then the coupling pieces 25 are pressed into the shaft body 17. Thus, the shaft body 17 and the coupling pieces 25 are tightly fixed by means of plastic deformation and adhesion. As shown in FIG. 5, the pair of shaft end members 19A, 19B are fixedly fitted into the large-diameter portions 25c of the inner peripheral portions of the coupling pieces 25. The shaft end members 19A, 19B each have at ends thereof a hole portion 19c formed with a female screw. A male screw 27 disposed inside the hollow portion 25a of each coupling piece 25 is screwed into the female screw formed in the hole portion 19c. Thus, the shaft end embers 19A, 19B are tightly fixed to the coupling pieces 25.

Figure 7A:
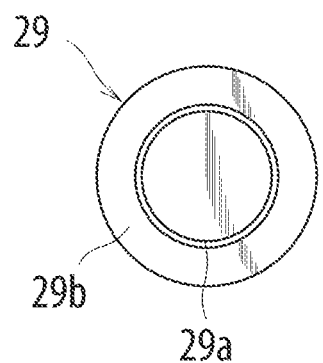
FIGS. 7A and 7B are a front view and an enlarged partial view as viewed from the right side, respectively, of an insulating pipe mounted with excitation windings, which is used for the linear motor of FIG. 1.
Figure 7B:
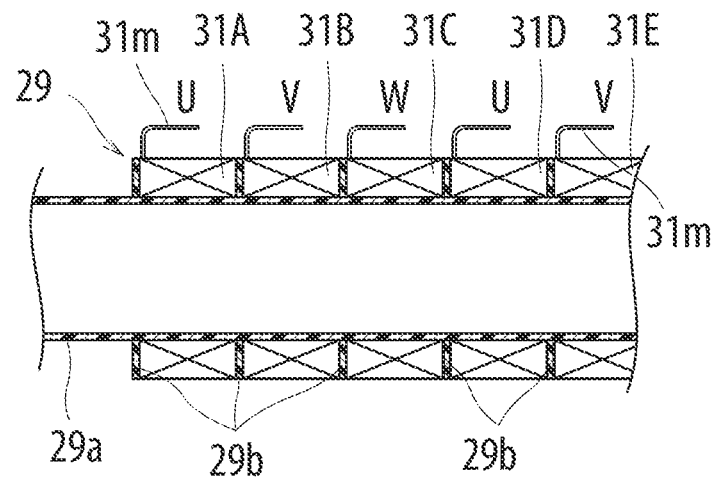

As shown in FIG. 4, the stator 9 includes an insulating pipe 29, a plurality of excitation windings 31A to 31L, a pair of end brackets 33, and a pair of bearings 35. The insulating pipe 29 is made from stainless metal material coated with glass epoxy, insulating paint, or the like. As shown in FIGS. 7A and 7B, the insulating pipe 29 includes a cylindrical body 29a having a thickness of approximately 0.2 mm and thirteen annular partition walls 29b extending radially from the body 29a. The excitation windings 31A to 31L are each disposed between two adjacent partition walls 29b. The excitation windings 31A to 31L are each formed of a winding conductor wound in a coil around a portion of the body 29a of the insulating pipe 29 between two adjacent partition walls 29b. Three consecutive excitation windings 31A to 31L are grouped as one unit. Excitation currents having three phases shifted by 120° in terms of electrical angle are supplied to the unitized excitation windings. As a result, the excitation currents flow through the excitation windings 31A to 31L in the order of U-phase, V-phase, W-phase, U-phase, V-phase, W-phase, and so on. Lead wires 31m are connected to each of the excitation windings 31A to 31L to supply electric power to the excitation windings 31A to 31L.

Figure 8A:
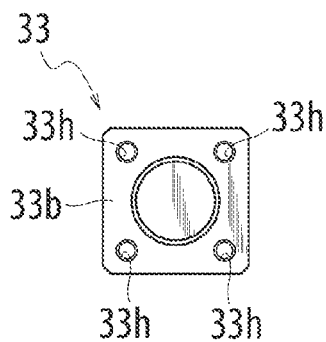
FIGS. 8A to 8C are a front view, a right side view, and a back view, respectively, of an end bracket used in the linear motor of FIG. 1.
Figure 8B:
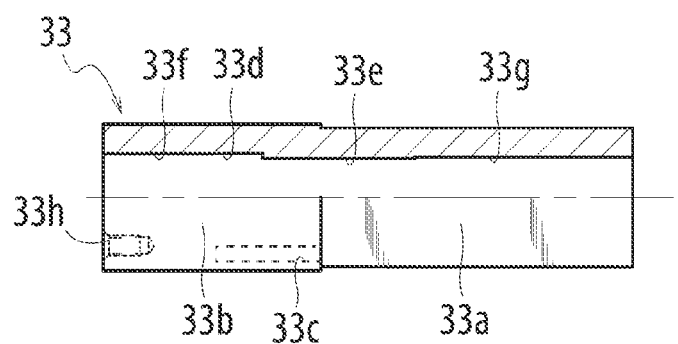
Figure 8C:
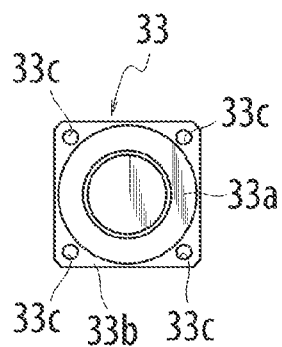

As shown in FIGS. 8A to 8C, cross-sectional partial views, the pair of end brackets 33 are cylindrical in shape and are formed of metal material such as aluminum or workable plastic material. Each end bracket 33 has a bracket body portion 33a, and an enlarged portion 33b having a larger dimension than the bracket body portion 33b as measured in a direction perpendicular to the axial direction. The bracket body portion 33a has a circular outline as viewed in the axial direction. The enlarged portion 33b has a rectangular outline as viewed in the axial direction. Four pin insertion holes 33c are formed at four corners of the enlarged portion 33d on the side of the bracket body portion 33a. Four tap holes 33h are formed at four corners of the enlarged portion 33b on the opposite side of the bracket body portion 33a. The four pin insertion holes 33c are fitted with pins 37 forming a pressing member shown in FIGS. 2 and 3. The pins 37 are each made of stainless metal material or the like and are elongated columns in shape. Two of the four pins 37 are disposed along an outer surface of the first divided assembly 39A and are operable to press the first divided assembly 39A onto the bracket body 33a. Likewise, the other two pins 37 are disposed along an outer surface of the second divided assembly 39B and are operable to press the second divided assembly 39B onto the bracket body 33a. A female screw is formed in each of the four tap holes 33h, and is used to mount the linear motor 1 onto some external location.

As shown in 8B, the end brackets 33 each have a hollow portion 33d inside thereof. The hollow portion 33d has a small-diameter portion 33e and first and second large-diameter portions 33f, 33g having a larger diameter than the small-diameter portion 33e. The insulating pipe 29 is fixedly fitted into the second large-diameter portion 33g of the end bracket 33. The bearing 35 is fixedly fitted into the first large-diameter portion 33f of the end bracket 33. As shown in FIG. 4, the pair of bearings 35 are fixed respectively onto the pair of end brackets 33 to support both ends of the direct drive shaft 11 of the mover 7 slidably in the thrust direction or axial direction and unrotatably in the circumferential direction.

Returning to FIGS. 1 to 3, in the linear motor mentioned above, the linear motor body 3 is housed or wrapped by the back yoke 5. The back yoke 5 is disposed outside the stator 9 of the linear motor body 3 to partly form the magnetic circuit of the linear motor body 3. The back yoke 5 is constituted from a back yoke assembly including a first divided assembly 39A and a second divided assembly 39B. The first and second divided assemblies 39A, 39B have the same dimension and shape, and are formed by press wording a silicon steel plate or SPCC magnetic plate having a thickness of 0.5 to 1.0 mm. Referring to FIGS. 9A and 9B, a front view and a right side view of one of the first and second divided assemblies that have the same dimension and shape, the structure of the divided assembly is described below. As shown in FIGS. 9A and 9B, the first and second divided assemblies 39A, 39B are circular in shape as viewed in the axial direction, and each have a through hole 39c formed in the center thereof for the lead wires 31m connected to the excitation windings 31A to 31L to pass therethrough. The through hole 39c is formed in a slit located in the middle of the axial line of the direct drive shaft 11 and extending in the axial direction. The length of the silt as measured in the axial direction is in a range of $(n-\frac{1}{2})\tau p$ to $(n+\frac{1}{2})\tau p$ where n stands for a natural number and $\tau p$ for a pitch of the permanent magnets in the permanent magnet array (See FIG. 4). The dimension between the center of the through hole 39c in the axial direction and the center of the first or second assembly 39A, 39B in the axial direction is preferably in a range of $\frac{1}{4}\tau p$ to $\frac{1}{2}\tau p$ where $\tau p$ denotes a pitch of the permanent magnets in the permanent magnet array. In this embodiment, a bundle 41 of the lead wires 31m connected to the excitation windings 31A to 31L is guided out through one end portion of the through hole 39c as shown in FIGS. 2 and 3. The lead wires 31m and a major part of the through hole 39c are covered by a cover made of an insulating material or resin molding material 43. A pair of end portions 39d, 39e of the first divided assembly 39A located in a width direction of the first divided assembly 39A are abutted onto the pair of end portions 39e, 39d of the second divided assembly 39B located in a width direction of the second divided assembly 39B, respectively. Thus, as shown in FIG. 2, the first and second divided assemblies 39A, 39B are combined such as the abutting surfaces A extend in the axial direction, and are disposed between the bracket body portions 33a of the pair of end brackets 33 of the linear motor body 3.

Now, the following paragraphs will describe how to mount the first and second divided assemblies 39A, 39B onto the linear motor body 3. First, a bracket body portion 33a of each end bracket 33, to which pins 37A to 37D have not been mounted yet, is formed. Then, an adhesive made of epoxy resin or the like is applied to given positions of the first and second divided assemblies 39A, 39B or the linear motor body 3. Next, the first and second divided assemblies 39A, 39B are combined and disposed together on the linear motor body 3. Next, a bundle 41 of the lead wires 31m connected to the excitation windings 31A to 31L is guided out from one end portion of the through hole 39c. Then, each lead wire 31m and a major part of the through hole 39c are covered by a cover made of an insulating material or a resin molding material 43. Next, four pins 37 are inserted into the pin insertion holes 33c formed in four corners of the enlarged portion 33b of each end bracket 33. Thus, the pins 37 work to press the first and second divided assemblies 39A, 39B onto the bracket body portions 33a.

In the linear motor according to this embodiment of the present invention, the back yoke 5 is constituted from a back yoke assembly (the first and second divided assemblies 39A, 39B) that entirely surrounds or wraps the linear motor body 3. Thus, the back yoke 5 may readily be mounted onto the linear motor body 3.

Figure 11A:
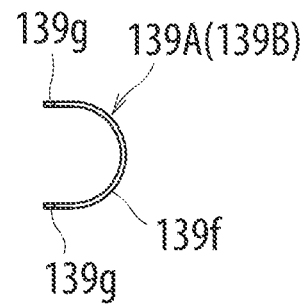
FIGS. 11A to 11C are a front view, a plan view, and a right side view, respectively, of the first and second divided assemblies used in the linear motor of FIG. 10.
Figure 11B:
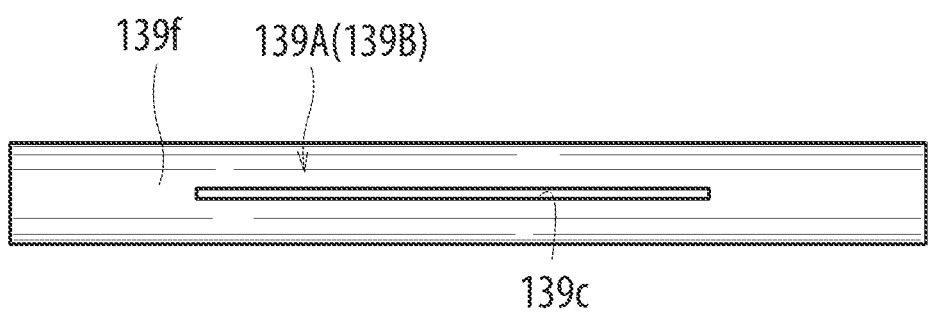
Figure 11C:
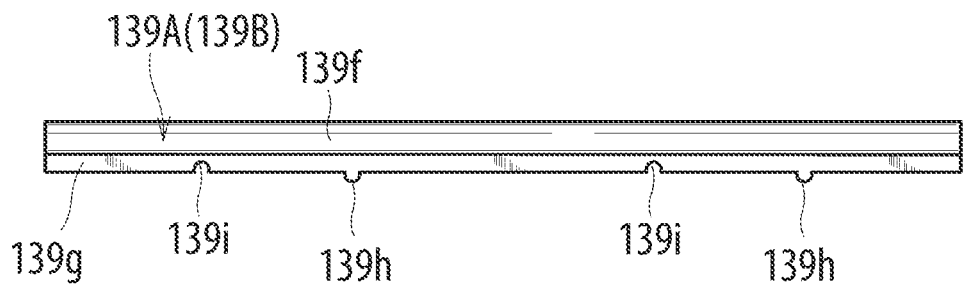

FIG. 10 is a right side view of a linear motor according to another embodiment of the present invention. The linear motor of this embodiment is the same in structure as that shown in FIGS. 1 to 9 except a back yoke. The counterparts of FIG. 10 except the back yoke are allocated reference numbers defined by adding 100 to those allocated to the parts of FIGS. 1 to 9, and the explanation of such counterparts is omitted. A back yoke 105 of this embodiment is also constituted from a back yoke assembly including a first divided assembly 139A and a second divided assembly 139B. The first and second divided assemblies 139A, 139B have the same dimension and shape. Referring to FIGS. 11A to 11C, a front view, a plan view, and a right side view of one of the first and second divided assemblies 139A, 139B that have the same dimension and shape, the structure of the divided assembly is described below. The first and second divided assemblies 139A, 139B each have an arc central portion 139f and a pair of flat plate portions 139g disposed at either end of the arc central portion 139f. As shown in FIG. 11B, a through hole 139c is formed in the center of the central portion 139f for the lead wires to pass therethrough. As shown in FIG. 11C, two convex portions 139h and two concave portions 139i are alternately formed at either ends of each flat plate portion 139g in a width direction thereof. The convex portions 139h are semi-circular in shape. The concave portions 139i are semi-circular in shape to allow the convex portions 139h to fit therein. As shown in FIG. 10, the convex portions 139h of the first divided assembly 139A are fitted in the concave portions 139i of the second divided assembly 139B, and the convex portions 139h of the second divided assembly 139B are fitted in the concave portions 139i of the first divided assembly 139A when the first and second divided assemblies 139A, 139B are combined such that the abutting surfaces A extend in the axial direction.

According to the linear motor of the present invention, the first and second divided assemblies 139A, 139B may tightly be fixed by accurately positioning the first and second divided assemblies 139A, 139B by means of the fitting of the convex portions 139h and concave portions 139i.

Figure 12A:
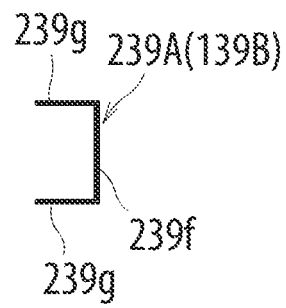
FIGS. 12A to 12C are a front view, a plan view, and a right side view, respectively, of the first and second divided assemblies used in a linear motor according to still another embodiment of the present invention.
Figure 12B:
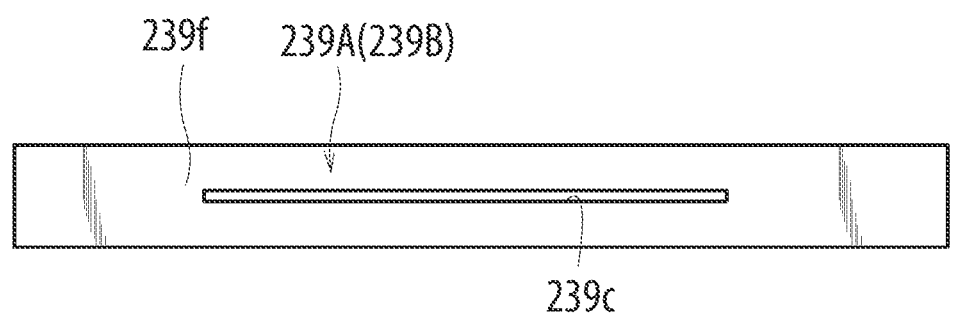
Figure 12C:
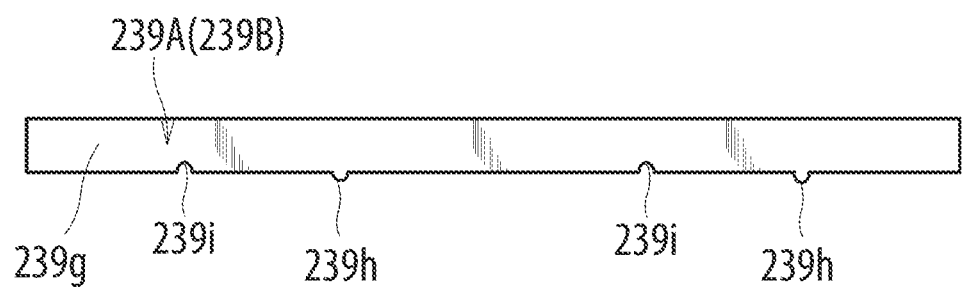

FIGS. 12A to 12C are a front view, a plan view, and a right side view, respectively, of the first and second divided assemblies used in a linear motor according to still another embodiment of the present invention. The parts of FIGS. 12A to 12C are allocated reference numbers in the 200's. The first and second divided assemblies of the linear motor of this embodiment each have a central portion 239f shaped in a rectangular flat plate. The dimension of a pair of flat plate portions 239g as measured in a width direction thereof is longer than that of the pair of flat plate portions 139g of the linear motor shown in FIGS. 10 and 11.

Figure 13:
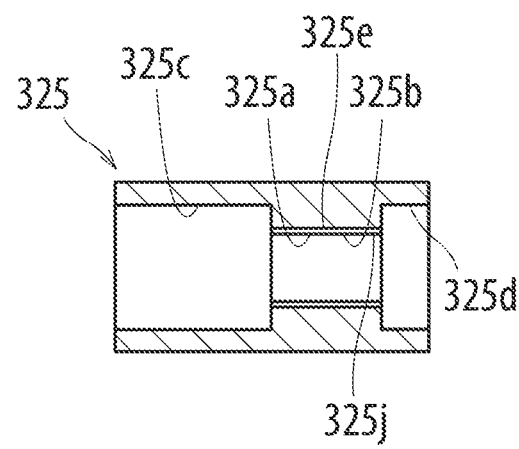
FIG. 13 is a cross sectional view of another coupling piece usable for the linear motor of the present invention.
Figure 14:
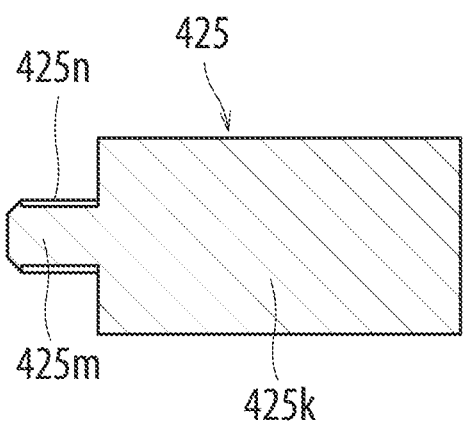
FIG. 14 is a cross sectional view of still another coupling piece usable for the linear motor of the present invention.

In the linear motor of the present invention, various types of coupling pieces cross-sectionally shown in FIGS. 13 and 14 may be used in addition to those shown in FIGS. 5 and 6. The coupling pieces shown in FIG. 13 are the same in structure as those shown in FIGS. 5 and 6 except a projecting portion inside the hollow portion. Except the projecting portion, the counterparts of FIG. 13 are allocated reference numbers defined by adding 300 to those allocated to the parts of FIGS. 5 and 6, and the explanation of such counterparts is omitted. In this embodiment, the projecting portion 325e of each coupling piece 325 is formed with a female screw 325j. The male screw disposed inside a hollow portion 325a of the coupling piece 325 (see the screw 27 in FIG. 5) is screwed into the female screw 325j of the projecting portion 325e. The parts of FIG. 14 are allocated reference numbers in the 400's. The coupling piece 425 shown in FIG. 14 does not have a hollow portion, and includes a body 425k and a pair of protrusions 425m protruding from the body 425k toward the pair of shaft end members (see the shaft end member 19A in FIG. 5). A male screw 425n is formed in each protrusion 425m. The male screw 425n is screwed into a female screw formed in a hole at an end of each of the pair of shaft end members. When using the coupling piece 425 of this embodiment, the pair of shaft end members may be fixed to the coupling pieces 425 without using screws.

Figure 15:
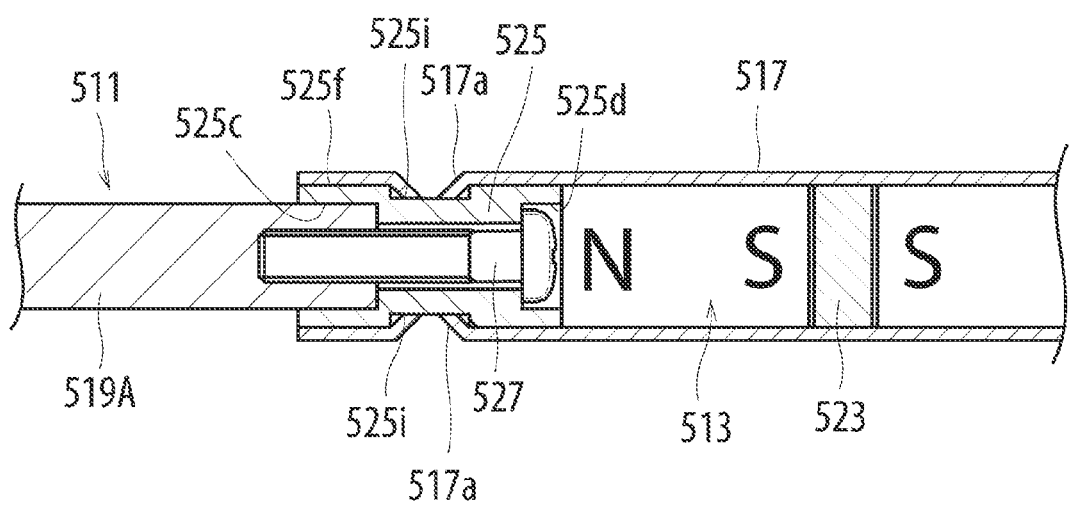
FIG. 15 is a cross sectional partial view of another mover usable for the linear motor of the present invention.
Figure 16A:
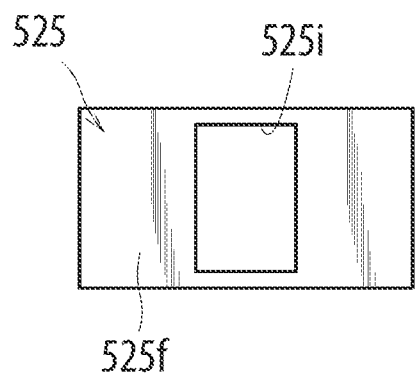
FIGS. 16A and 16B are a plan view and a cross sectional view, respectively, of a coupling piece used in the mover of FIG. 15.
Figure 16B:
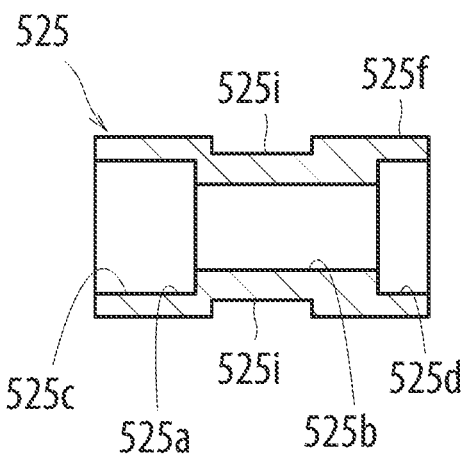
Figure 17:
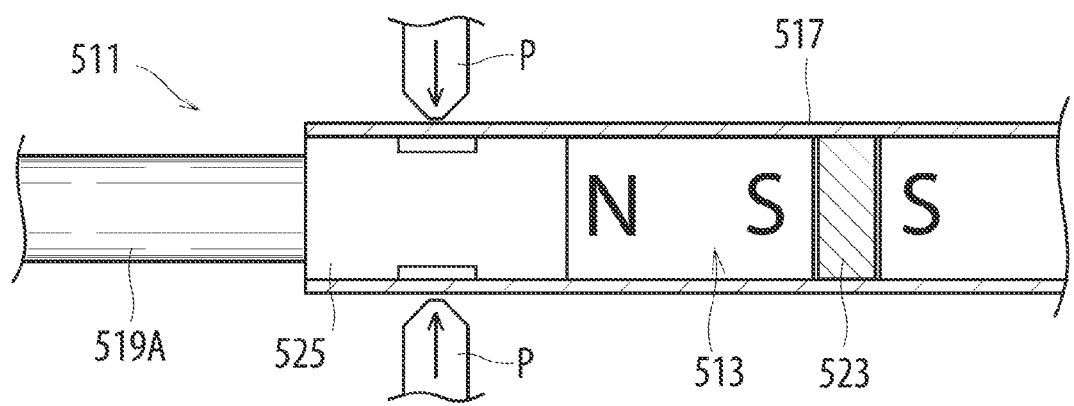
FIG. 17 is an illustration used to explain how to construct the mover of FIG. 15.

FIG. 15 is a cross sectional partial view of another mover usable for the linear motor of the present invention. The mover of this embodiment is the same in structure as that of the linear motor shown in FIGS. 5 and 6 except a shaft body and coupling pieces. The counterparts except the shaft body and coupling pieces of this embodiment are allocated reference numbers defined by adding 500 to those of the parts shown in FIGS. 5 and 6, and the explanation of the counterparts is omitted. As shown in FIGS. 16A and 16B, the surface of an outer peripheral portion 525f of each coupling piece 525 is smooth. The outer peripheral portion 525f is formed with two rectangular concave portions 525i radially opposed to each other. As shown in FIG. 15, the shaft body 517 is formed with two convex portions 517a to be fitted with the two concave portions 525i of the coupling piece 525. The convex portions 517a are formed by press working the shaft body 517 fitted with the coupling piece 525 using a pressing machine P as shown in FIG. 17. The concave portions 525i are fitted with the convex portions 517a, thereby tightly fixing the coupling pieces 525 to the shaft body 517.

According to the present invention, a back yoke is constituted from a back yoke assembly that entirely surrounds or wraps the linear motor body. The back yoke may readily be mounted onto a liner motor body simply by combining the back yoke assembly with the linear motor body.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:
1. A linear motor comprising:
   a linear motor body including:
      a mover including a direct drive shaft capable of reciprocating in an axial direction thereof and a permanent magnet array formed of a plurality of permanent magnets mounted to the direct drive shaft; and
      a stator having a plurality of excitation windings disposed along an axial line of the direct drive shaft, the excitation windings being each formed of a winding conductor wound in a coil such that the mover reciprocates in an inner space defined inside the excitation windings; and a back yoke disposed outside the stator of the linear motor body to partly form a magnetic circuit of the linear motor body, wherein:

the back yoke assembly includes a first divided assembly and a second divided assembly that are combined such that abutting surfaces of the first and second assemblies extend in the axial direction;

the stator including an insulating pipe inside of which the mover is disposed and on which the excitation windings are mounted;

a pair of end brackets are fixed at axial ends of the insulating pipe, the end brackets each having a bearing fixed therein to support the end of the direct drive shaft movably in the axial direction and unrotatably in a circumferential direction;

the back yoke assembly is disposed across the pair of end brackets;

the pair of end brackets each include a bracket body portion into which the insulating pipe is inserted and fitted and with which end portions of the back yoke assembly are fitted, and an enlarged portion provided continuously with the bracket body portion and having a larger dimension than the bracket body portion as measured in a direction perpendicular to the axial direction; and one or more pressing members are fixedly provided along an outer surface of the first divided assembly and operable to press only the first divided assembly onto each bracket body portion, and one or more pressing members are fixedly provided along an outer surface of the second divided assembly and operable to press only the second divided assembly onto each bracket body portion.

2. The linear motor according to claim 1, wherein the first and second assemblies have the same dimension and shape.

3. The linear motor according to claim 1, wherein the first and second assemblies are each formed by press working a magnetic plate.

4. The linear motor according to claim 1, wherein:
lead wires are connected to the excitation windings to supply electric power to the excitation windings; and
at least one of the first and second assemblies has a through hole formed for the lead wires to pass therethrough.

5. The linear motor according to claim 1, wherein:
the direct drive shaft includes a cylindrical shaft body housing the permanent magnet array formed of the plurality of permanent magnets that are arranged such that magnetic poles having the same polarity are opposed to each other, and a pair of shaft end members connected to axial ends of the shaft body and supported by the bearings;
the shaft body and the pair of shaft end members are coupled by coupling pieces;
the shaft body is fixedly fitted with an outer peripheral portion of each coupling piece; and
the shaft end members are fixedly fitted into an inner peripheral portion of each coupling piece.

6. The linear motor according to claim 5, wherein:
the outer peripheral portion of each coupling piece has a smooth surface portion located to the center of the shaft body in a longitudinal direction of the shaft body and a rough surface portion located away from the center of the shaft body in the longitudinal direction; and
end portions of the shaft body are disposed to be in contact with both of the smooth and rough surface portions.

7. The linear motor according to claim 5, wherein:
the outer peripheral portion of each coupling piece has a plurality of concave portions formed therein; and
the end portions of the shaft body have a plurality of convex portions formed therein to be fitted with the concave portions.

8. The linear motor according to claim 1, wherein:
each enlarged portion has a rectangular outline as viewed in the axial direction; and
pins forming each pressing member are fixed to four corners of each enlarged portion.

* * * * *